United States Patent [19]

Tegtmeyer et al.

[11] Patent Number: 5,284,589
[45] Date of Patent: Feb. 8, 1994

[54] PROCESS FOR THE TREATMENT OF EFFLUENT

[75] Inventors: Dietrich Tegtmeyer, Koeln; Friedrich-Wilhelm Baumann, St. Margarethen; Günter Stephan, Marne, all of Fed. Rep. of Germany

[73] Assignee: Bayer Aktiengesellschaft, Leverkusen, Fed. Rep. of Germany

[21] Appl. No.: 939,199

[22] Filed: Sep. 2, 1992

[30] Foreign Application Priority Data

Sep. 12, 1991 [DE] Fed. Rep. of Germany ....... 4130334

[51] Int. Cl.$^5$ .............................. B01D 61/00
[52] U.S. Cl. ................................. 210/641; 210/650; 210/652; 210/653; 210/180; 210/490; 210/774; 210/805
[58] Field of Search ............... 210/650, 652, 774, 180, 210/490, 654, 713, 641, 651, 450, 180, 774, 509, 500.27, 653, 805; 162/29; 159/17.1

[56] References Cited

U.S. PATENT DOCUMENTS

| | | | |
|---|---|---|---|
| 3,632,505 | 1/1972 | Nelson | 210/652 |
| 4,039,440 | 8/1977 | Cadotte | 210/654 |
| 4,086,164 | 4/1975 | Noda et al. | 210/713 |
| 4,105,556 | 8/1978 | D'Amaddio et al. | 210/257 |
| 4,592,768 | 6/1986 | Cutler et al. | 210/774 |
| 4,752,363 | 6/1988 | Buckley et al. | 204/98 |
| 5,053,142 | 10/1991 | Sorensen et al. | 210/742 |
| 5,091,093 | 2/1992 | Herwig et al. | 210/652 |
| 5,174,859 | 12/1992 | Rittof et al. | 210/774 |

FOREIGN PATENT DOCUMENTS

| | | |
|---|---|---|
| 0242761 | 4/1987 | European Pat. Off. . |
| 0302825 | 7/1988 | European Pat. Off. . |
| 2549882 | 11/1975 | Fed. Rep. of Germany . |
| 2610016 | 3/1976 | Fed. Rep. of Germany . |

OTHER PUBLICATIONS

Chemical Abstracts of JP 79/21197, vol. 79 No. 31.
Eberhard Staude, "Reversosmose farbstoff-haltiger Abwasser," in *Chemie-Ing. Techn.*, 1973, p. 1222-1225 (with appropriate section translated into English from German).
Gunter Mischer, "Eindampfung und Gasphasen-Oxidation industrieller Prozessabwasser mit Erzeugung von Abhitzedampf," in *Chem.-Ing.-Tech.*, 1985, pp. 859-863.
Kurt Marquardt, "Membranverfahren zur Erfullung neuer Abwassergrenzwerte," in *AbwallwirtschaftsJournal*, 1990, pp. 197 & 221, with appropriate section translated into English.

*Primary Examiner*—Robert A. Dawson
*Assistant Examiner*—Ana M. Fortuna
*Attorney, Agent, or Firm*—Sprung Horn Kramer & Woods

[57] ABSTRACT

The process for the working-up of effluents and disposal of the loads, present therein, by a combination of concentration by membrane filtration, evaporation and gas phase oxidation, is particularly viable economically because the concentrates to be incinerated have a very low salt content.

7 Claims, No Drawings

PROCESS FOR THE TREATMENT OF EFFLUENT

The disposal of problematical effluent streams via evaporation and subsequent gas phase oxidation (incineration) is state of the art (cf. e.g. Chem.-Ing.-Tech., 57 (1985) n° 10, pp. 859-863). However, this method of disposal is very expensive and hence is not economically viable for large volume streams with relatively low loadings. The treatment of effluent streams using membrane technology (cf. e.g. K. Marquart, Abfallwirtschaftsjournal, 2 (1990) n° 4), especially such a treatment of effluents containing dyes (Staude, Chem.-Ing.-Tech., 45 (1973) n° 20, p. 1222), is also state of the art. However, this method generally poses the problem of disposal of the concentrate produced, which then contains the bulk of the solid load.

The object of the present invention was thus to provide an economically viable process for the working-up of effluents using membrane technology, and at the same time to solve the associated problem of disposal of the effluent concentrates.

The present invention relates to a three-stage process for the working-up of effluents and disposal of the loads present therein, where the effluent is concentrated in a first stage by a membrane process and the resulting concentrate is evaporated in a second stage and incinerated in a third stage by gas phase oxidation.

The permeates obtained in the membrane process and the condensates obtained in the subsequent steps can either be recycled into the production, e.g. as washwater, or be treated further via other working-up processes; examples of such processes which may be mentioned are biological working-up, other membrane processes such as electrodialysis, adsorption processes or wet oxidation processes.

Effluents are to be understood as meaning especially factory effluents from the chemical industry, such as, for example, those obtained in dye synthesis in the form of effluents from separations, permeates from pressure permeations, or apparatus washwater.

The capacity of the effluent incineration is determined in many cases by the salt throughput. By contrast, combining the three process steps of the process according to the invention affords the possibility of keeping the content of inorganic salts very small compared with the organic load in the concentrate to be incinerated. In this way the residual organic load can be disposed of very much more economically. The remaining residue on ignition must be dumped or worked up.

In carrying out the process according to the invention, it has proved particularly advantageous in certain cases if the membrane process in the first process stage consists of a combination of two or more membrane processes in series, it being possible for the membranes used to differ according to the demands made on them in respect of their separation limits and/or their construction.

The membrane process for concentration of the effluents in the first stage of the process according to the invention is preferably pressure permeation on membranes, it being possible for the membrane processes used to be, in particular, reverse osmosis, micro-, ultra-, or nano-filtration or a combination of two or more of these methods.

In a preferred embodiment of the process according to the invention, the membrane process of the first process stage consists of a combination of two successive pressure permeation steps with membranes having different separation limits, in which the permeate of the first step is worked up again in a subsequent step, affording distinct advantages for the process stage as a whole.

An example of this is the combination of microfiltration and subsequent nanofiltration, where troublesome undissolved constituents are separated off in the first step and the permeation conditions are considerably improved in the second step during the nanofiltration. The two concentrates can then be introduced together into the second and third process stages.

It can also be advantageous to arrange two reverse osmosis steps in series for the membrane process in order to attain a particularly good permeate quality. As the permeate of the first working-up step is substantially salt-free, a very high permeate flow is achieved in the second working-up step. Depending on load, the concentrate of the second step can either be added to the effluent upstream of the first step, or passed, together with the concentrate from the first step, to the evaporation and subsequent incineration.

In the first process step it is preferable to use effluents having a low salt content of <1% by weight, which are then concentrated by means of reverse osmosis to a salt content of at most 4% by weight. The resulting concentrates are then evaporated in the second process stage to a solids content of 50-80% by weight, preferably 60-75% by weight.

In the working-up of salt-containing effluents with salt contents of >1% by weight, the first stage, i.e. concentration using membrane technology, is preferably carried out with membranes which possess the property of separating organic molecules with a molecular weight of >150 daltons from inorganic salts. The concentrates obtained in this first process stage are then evaporated in the second stage to a solids content of for example 50-80% by weight, preferably approx. 70% by weight, and finally subjected in the third stage to gas phase oxidation.

In the third process stage the salt content of the concentrates used is generally 30 to 80% by weight for a solids content of for example 50-80% by weight, preferably 70% by weight.

Salts are to be understood in this context as meaning mainly inorganic salts containing monovalent metals, such as e.g. alkali metal halides or sulphates.

In the case of effluent streams with a high salt content (>2% by weight) and with organic loads which are adequately retained by a nanofiltration or ultrafiltration membrane, it can be advisable to subject the effluent not only to concentration but also to diafiltration (where the effluent is desalinated using membrane technology, the salt-containing permeate formed being continuously replaced with desalinated water). This desalination removes high solid loads from the concentrate to be incinerated, making the second and third process stages more effective economically.

Of particular advantage in the three-stage process is the possibility of the concomitant disposal of different effluent streams. As the pressure permeation preferably used in the first process stage is a very versatile process of modular design, it can accordingly be optimally adapted to the particular effluent streams. Thus different effluent streams can be concentrated, often each with different types of membranes and modules and under different operating conditions, and then evaporated and incinerated as a combined concentrate stream in the second or third process stage.

For the membrane process of the first stage of the process according to the invention, it is possible to use membranes consisting of different materials which possess different separation limits.

In the reverse osmosis, membranes are used which are permeable to water molecules but retain salts.

The ultrafiltration is operated with membranes which are permeable to molecules having a molecular weight of less than approx. 20,000 daltons, but preferably of less than 1000 daltons, and to inorganic salts.

Membranes which can be used for the nanofiltration are permeable to molecules having a molecular weight of less than 1000 daltons, preferably of less than approx. 150 daltons, and to monovalent ions; ions of higher valency are substantially retained by these membranes.

In principle, symmetrical, asymmetrical and/or composite membranes can be used for this purpose. They can be made of either organic or inorganic materials.

Examples of organic materials are those made of polyvinylidene fluoride, cellulose acetate, polytetrafluoroethane, polyacrylonitrile, polyethyleneimine, polyacrylonitrile/vinylpyrrolidone copolymers, polysulphone, polyamide, polyhydantoin or polyolefins which have been rendered hydrophilic, e.g. those based on polypropylene.

Other suitable membranes are those which have on one side of the membrane support an asymmetrical coating consisting essentially of at least one polymer layer which has been formed from an organic, film-forming, hydrophilic polymer and a monomeric ionic compound and/or a crosslinking agent, and of a thin, semipermeable, interfacially crosslinked film containing ionic groups which are present on the upper side of this layer and are integrally bonded thereto, with the proviso that said films are not amphoteric, interfacially crosslinked films. The polymer layer can contain cationic or amphoteric charges and the thin film present on the upper side of the polymer layer can contain free anionic groups. Such membranes are described for example in European Patent Application A-0 242 761.

Inorganic membranes can be those made of porous metal or metal alloys (so-called sintered metal membranes, e.g. made of porous steel) or those made of porous carbon, the surface of which can be covered e.g. with a thin layer of zirconium dioxide, silicon oxide or aluminium oxide, or else those made of porous glass or ceramic.

Preferably, to carry out the process according to the invention, the solutions are subjected to pressure permeation on asymmetrical membranes or composite membranes which may be modified with ionic groups, the extracted permeate either containing salt or being salt-free, depending on the particular pore size of the membranes used.

Any commercially available pressure permeation units can be used for the concentration of the first stage of the process according to the invention. Such devices can take the form of e.g. a plate module, frame module, tube module, hose module, wound module, hollow fibre module or hollow fibril module into which the above-described membranes can be incorporated.

If the effluent contains suspended particles, either it must be thoroughly prefiltered or the plant must be suitable for the pressure permeation of suspensions.

Conventional static filter techniques, which can be operated reversibly if appropriate, are suitable for the prefiltration.

The second and third process stages consist of evaporation and gas phase oxidation of the concentrates produced, with the generation of waste-heat steam, as precisely described for example in Chem.-Ing.-Tech., 57 (1985) n° 10, pp. 859–863. The concentrate is evaporated in a multistage process to a solids content of approx. 70% by weight and then, because of the high salt content of >40% by weight, passed through two flame vaporising burners and atomised with superheated steam. The organic load is thereby incinerated and the inorganic part is discharged as the residue on ignition. The fumes are subsequently purified in a quench cooler and an electrostatic condensation filter.

EXAMPLE 1

A factory effluent with a chloride content of 0.02% and a total carbon content (TOC content according to DIN 38 409, part 3) of 2830 mg/l is concentrated to 1/10 of the initial volume in a one-stage process, via a composite reverse osmosis membrane (polyamide layer on polysulphone support, salt retention >97%), in a wound module, at a temperature of 20° C. and a working pressure of 40 bar. An average permeate flow of 540 l/m$^2$.d was achieved. Analogous results can also be obtained with other types of membrane, e.g. those based on cellulose acetate etc. The resulting permeate has an average chloride content of 0.004% and a TCC content of 6 mg/l and can be recycled into the production. The concentrate, which has a solids content of approx. 4%, is evaporated to a solids content of approx. 70%. In this form it is a pumpable slurry; this is sprayed into a flame in which the remaining water evaporates and the organic constituents are incinerated.

EXAMPLE 2

A factory effluent with a chloride content of 3.1%, a TOC content of 2740 mg/l and a content of adsorbable, organically bonded chlorine (AOX content according to DIN 38 409, part 14) of 350 mg/l is first worked up in a process using membrane technology, which consists of two steps. In the first step the effluent is microfiltered at 3 bar and 25° C. with a symmetrical polypropylene membrane diameter 0.2 $\mu$) in a tubular arrangement, and concentrated to more than 98%, based on the initial volume. The average permeate flow is approx. 3000 l/m$^2$.d. In a second step the resulting permeate is concentrated via nanofiltration (composite membrane, polyamide layer on polyether-sulphone support, separation limit 300 daltons), in a tube module, at 40 bar and 25° C. Concentration to approx. 25%, based on the initial volume, was achieved for an average permeate flow of 400 l/m$^2$.d. Similar results are obtained if ceramic membranes with a pore diameter of the same order of magnitude are used in the first step and/or types of membranes such as those described for instance in European Patent Application A-0 242 761 are used in the second step.

The permeate from the nanofiltration, which has a TOC content of 115 mg/;, an AOX content of 28 mg/l and a chloride content of 2.5%, is subjected to a biological aftertreatment. The two concentrates are evaporated and incinerated according to Example 1.

When the factory effluent was subjected directly to nanofiltration, an average permeate flow of only 245 l/m$^2$.d was achieved, again for concentration to 25% of the initial volume, under the same conditions (25° C., 40 bar). The permeate was of approximately the same quality. Thus, in the two-step working-up using membrane technology, the efficacy of the nanofiltration is markedly increased by approx. 40% due to the upstream microfiltration.

EXAMPLE 3

A factory effluent with a chloride content of 0.4% and a TOC content of 2100 mg/l is worked up in a two-stage process.

In the first step the effluent is concentrated to approx. 15% of the initial volume via a composite reverse osmosis membrane (as described in Example 1), in a wound module, at 40 bar and 25° C. An average permeate flow of 520 l/m$^2$.d was achieved. The permeate, which had a TOC content of 30 mg/l and a chloride content of 0.002%, is concentrated to 5% of the initial volume in a second step, again via reverse osmosis (same membrane), at 30 bar and 25° C. The permeate flow here was 1100 l/m$^2$.d.

The permeate obtained in the second step is so clean that it can be reused for the synthesis of new products. The two concentrates are combined and together passed to the second and third stages of the process, namely evaporation and incineration, where they are worked up according to Example 1.

What is claimed is:

1. A process for the working-up of effluents and disposal of the loads present therein, in which the effluent is concentrated in a first stage by a membrane process which consists of a combination of at least two pressure permeation membrane processes in series which are selected from the group consisting of micro-, ultra- and nano-filtration, and the resulting concentrate is evaporated in a second stage, and incinerated in a third stage by gas phase oxidation.

2. A process according to claim 1, in which the permeate of the first membrane process is worked up in the second membrane process and the concentrate of the second membrane process is either passed into the original effluent stream or passed, together with the concentrate of the first membrane process, to the second and third process stages.

3. A process according to claim 1, in which the membrane process of the first process stage consists of a combination of microfiltration and subsequent nanofiltration.

4. A process according to claim 1, in which the working-up of salt-containing effluents, the first process stage is carried out with membranes which possess the property of separating organic molecules with a molecular weight of more than 150 daltons from inorganic salts.

5. A process according to claim 1, in which for the membrane process of the first process stage, symmetrical, asymmetrical or composite membranes are used which can consist of either organic or inorganic materials.

6. A process according to claim 1, in which asymmetrical membranes based on organic or inorganic materials, or composite membranes, which may subsequently be chemically modified with ionic groups and/or by the application of special polymer layers, are used in the first process stage.

7. A process according to claim 1, in which the membranes used in the first process stage have on one side of the membrane support an asymmetrical coating consisting essentially of at least one polymer layer which has been formed from an organic, film-forming, hydrophilic polymer and a monomeric ionic compound and/or a crosslinking agent, and of a thin, semipermeable, interfacially crosslinked film containing ionic groups which are present on the upper side of this layer and are integrally bonded thereto, with the proviso that said films are not amphoteric, interfacially crosslinked films.

* * * * *